United States Patent
Knoll et al.

[11] Patent Number: 5,884,534
[45] Date of Patent: Mar. 23, 1999

[54] COVERING FOR A FOOT-PEDAL OF A MOTOR VEHICLE

[75] Inventors: Karl-Heinz Knoll, Weinstadt; Martin Mueller, Denkendorf, both of Germany

[73] Assignee: Mercedes-Benz AG, Stuttgart, Germany

[21] Appl. No.: 811,536

[22] Filed: Mar. 4, 1997

[30] Foreign Application Priority Data

Mar. 19, 1996 [DE] Germany .................. 196 10 7520.0

[51] Int. Cl.$^6$ .................................................. G05G 1/16
[52] U.S. Cl. .................................................. 74/562; 74/563
[58] Field of Search ................ 74/563, 560, 561, 74/562, 562.5

[56] References Cited

U.S. PATENT DOCUMENTS

| | | | |
|---|---|---|---|
| 270,920 | 1/1883 | Woodward et al. | 74/563 |
| 696,362 | 3/1902 | Farmer | 74/563 X |
| 1,210,016 | 12/1916 | Sunden | 74/563 |
| 1,297,202 | 3/1919 | McGiehan | 74/563 |
| 1,784,781 | 12/1930 | Bronson | 74/563 X |
| 4,084,561 | 4/1978 | Miller | 74/560 X |
| 4,176,562 | 12/1979 | Allert et al. | |
| 5,609,069 | 3/1997 | Swenson | 74/563 |
| 5,673,597 | 10/1997 | Lin | 74/563 |

FOREIGN PATENT DOCUMENTS

| | | | |
|---|---|---|---|
| 1 962 400 | 6/1971 | Germany | 74/560 |
| 1 555 211 | 11/1979 | United Kingdom . | |

*Primary Examiner*—Charles A. Marmor
*Assistant Examiner*—Mary Ann Battista
*Attorney, Agent, or Firm*—Evenson, McKeown, Edwards & Lenahan, P.L.L.C.

[57] ABSTRACT

An elastic covering cap for a foot-pedal of a motor vehicle which can be produced economically, while functioning well and having a pleasing aesthetic effect. For this purpose, the covering cap includes, on its foot-rest surface, a multiplicity of studs which have a mushroom-like shape and over the mushroom heads of which a perforated ornamental plate can be snapped on so as to be form-lockingly fitted underneath the mushroom heads.

4 Claims, 1 Drawing Sheet

COVERING FOR A FOOT-PEDAL OF A MOTOR VEHICLE

BACKGROUND AND SUMMARY OF THE INVENTION

The invention relates to a covering for a foot-pedal, and in particular to a covering for a foot-pedal of a motor vehicle.

A covering for a foot-pedal of a motor vehicle should have a non-slip profile with a good grip on the foot-rest surface. Furthermore, a visually pleasing appearance is often desirable.

A covering for a foot-pedal of a motor vehicle is known, for example, from U.S. Pat. No. 4,176,562, the disclosure of which is expressly incorporated by reference herein.

An object of the present invention is to provide a covering which may be simply assembled, which can be efficiently and economically manufactured, and which is aesthetically attractive. These and other objects have been accomplished according to the present invention by providing a covering for a foot-pedal of a motor vehicle, comprising an elastic covering cap including a plurality of connection studs on a foot-rest surface; and a perforated plate having a plurality of perforations which correspond to said connection studs, such that said perforated plate can be snapped over said connection studs.

According to the present invention, the covering for the foot-pedal is advantageously made in two parts. An elastic support body, which can be fitted onto the foot-pedal, is provided with connection studs extending outwardly from a base portion (foot-engagement surface). A perforated ornamental plate can be simply snapped over the connection studs of the elastic support body.

In order to obtain a positive form-locking connection between the perforated plate and the elastic support body, the connection studs are designed with a lower leg portion, and an upper head portion which extends laterally from said leg portion, such that said head portion includes a downwardly facing support surface. In one preferred embodiment, the connection studs are formed in a mushroom-shaped manner. The perforated plate is provided with perforations which correspond in spacing to the connection studs, and which have a periphery smaller than the periphery of the head portions of the connection studs. In one preferred embodiment, the periphery of the perforations essentially corresponds to a periphery of the leg portions of the connection studs. Since the connection studs are made of an elastic material, the perforated plate can be snapped over the upper head portions of the connection studs such that the perforated plate is held in a form-locking manner by the lower leg portions of the connection studs and/or the downwardly facing support surfaces of the connection studs. The thickness of the perforated plate is essentially equal to the distance between the downwardly facing support surfaces of the heads of the connection studs and the base portion.

A foot-pedal covering designed according to the invention can be given aesthetically highly attractive appearance by use of different materials and different colors of the studs and of the ornamental plate. The elastic support body may be made of any suitable elastic material, for example, of rubber or an elastic polymer. The perforated ornamental plate may be made of various suitable materials, for example, of metal, plastic, or even wood. When a metal perforated plate is used, the pedal acquires a very sporty and pleasing appearance.

Other objects, advantages and novel features of the present invention will become apparent from the following detailed description of the invention when considered in conjunction with the accompanying drawings.

DETAILED DESCRIPTION OF THE DRAWINGS

Figure 1:
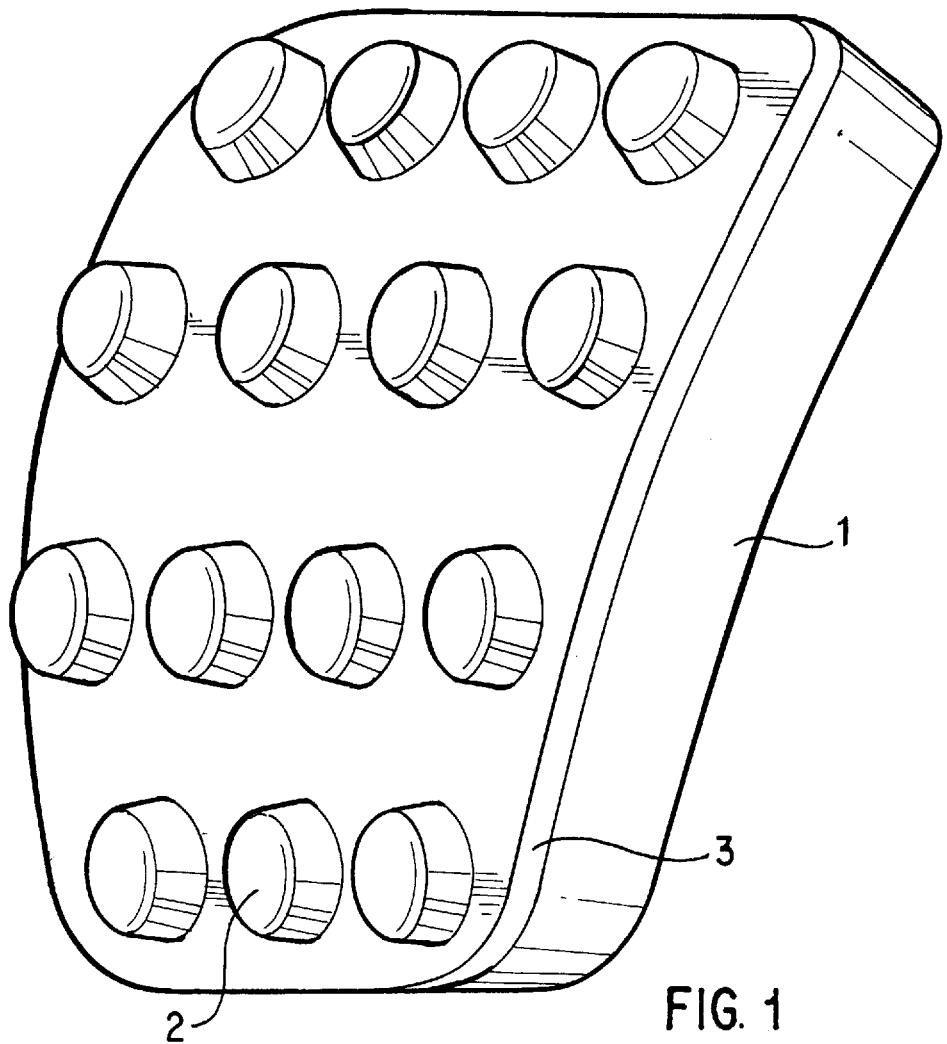
FIG. 1 shows a perspective view of a foot pedal covering with a perforated ornamental plate, according to a preferred embodiment of the present invention.
Figure 2:
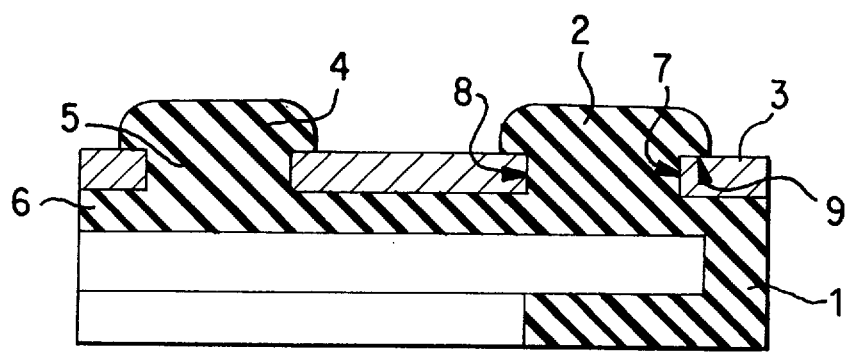
FIG. 2 shows a section through the connection studs of the covering of FIG. 1.

Referring to FIGS. 1–2, an elastic covering cap 1 to be attached onto a foot-pedal plate, not shown in the drawing, is provided with a multiplicity of mushroom-like connection studs 2 distributed over its footrest surface. The elastic covering cap 1 and connection studs 2 are formed in one piece from an elastic material, for example rubber or an elastic polymer, and may be of various colors. Since the connection studs 2 consist of the same elastic material as the elastic cap, the connection studs 2 are elastically deformable.

The connection studs 2, each designed in the form of a mushroom, include a head 4 and a contracted leg 5 located underneath the head 4 and functioning as a transition into the base portion 6 of the cap 1. An ornamental perforated plate 3 can be snapped on over the connection studs 2. The perforations 7 of the perforated plate 3 have a periphery which is smaller than a periphery of the heads 4. Preferably, the periphery of the perforations 7 essentially corresponds to a periphery 8 of the legs 5 of the connection studs 2. The perforated plate 3 is held in the snapped-on state between a downwardly facing surface 9 of the heads 4 of the connection studs 2 and the base 6 of the cap 1 in a positively form-locking manner, and over the entire surface. The thickness of the perforated plate 3 is essentially equal to the distance between the downwardly facing support surfaces 9 of the heads 4 of the connection studs 2 and the base portion 6.

The connection studs 2 may be made of any desired shape, as long as they include a head portion 4 extending laterally from a leg portion 5 to form downwardly facing surfaces 9 for holding the perforated plate 3. For example, the connection studs may be oval, square, triangular, or any polygonal shape.

The perforated plates 3 may be made from different materials, such as plastic, metal, or wood, and in different colors. Therefore, according to the invention a variety of different ornamental perforated plates 3 may be provided, each of which can be snapped onto an identical covering cap 1. Perforated plates made of metal are particularly attractive from an aesthetic point of view.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A covering for a foot-pedal of a motor vehicle, comprising:

an elastic covering cap including a base and a plurality of connection studs, each of said connection studs including a leg portion extending upwardly from the base and a head portion extending laterally from an upper end of the leg portion to define a downwardly facing surface which faces said base; and a perforated plate having a plurality of perforations which correspond to said connection studs, each of said perforations having a periphery which is smaller than a periphery of said head portions, said head portions being elastically deformable such that said perforated plate can be snapped over said head portions and held between said downwardly facing surfaces and said base;

wherein said base is adapted to be directly attached to said foot-pedal.

2. A covering for a foot-pedal of a motor vehicle according to claim 1, wherein said connection studs are mushroom-shaped.

3. A covering for a foot-pedal of a motor vehicle according to claim 1, wherein said perforations have a periphery which essentially corresponds to a periphery of said leg portions.

4. A covering for a foot-pedal of a motor vehicle according to claim 1, wherein said base and said connection studs are made in one piece.

* * * * *